US006530768B1

(12) United States Patent
Harrop

(10) Patent No.: US 6,530,768 B1
(45) Date of Patent: Mar. 11, 2003

(54) ULTRASONIC CUTTING SYSTEM

(75) Inventor: Martin Harrop, Clifton (GB)

(73) Assignee: Nestec S.A., Vevey (CH)

(*) Notice: Subject to any disclaimer, the term of this patent is extended or adjusted under 35 U.S.C. 154(b) by 243 days.

(21) Appl. No.: 09/709,734

(22) Filed: Nov. 13, 2000

(30) Foreign Application Priority Data

Nov. 15, 1999 (GB) ............................................. 9926998

(51) Int. Cl.[7] .............................. A23G 7/00; A23P 1/00

(52) U.S. Cl. ........................ 425/174.2; 83/956; 99/451; 426/238; 426/518

(58) Field of Search ................................. 426/518, 512, 426/238, 660; 99/451, DIG. 12; 156/580.1, 580.2, 73.3; 425/174.2, 296; 606/169; 83/956

(56) References Cited

U.S. PATENT DOCUMENTS 5,230,761 A * 7/1993 Crawford ................... 156/73.3
5,861,185 A * 1/1999 Capodieci .................... 426/512
5,928,695 A * 7/1999 Capodieci ............... 426/518 X
6,065,521 A * 5/2000 Tharpe, Jr. et al. ... 156/580.1 X

FOREIGN PATENT DOCUMENTS

EP 0 943 405 A2 9/1999

* cited by examiner

*Primary Examiner*—Peter Nerbun
(74) *Attorney, Agent, or Firm*—Winston & Strawn

(57) ABSTRACT

An ultrasonic cutting system including: an ultrasonic vibrating device having an operative face; a block horn having a responsive face connected to the operative face of the ultrasonic vibrating device and an operative face and being provided with at least one normal tuning slot having a width of about 4 mm to about 6 mm traversing the block between its operative and responsive faces; a plurality of cutting blades mounted on the operative face of the block horn so as to be vibrated therewith, the blades lying in a plane containing the longitudinal axis of vibrations such that the block horn is also provided with at least one thin tuning and damping slot having a width of about 0.1 mm to about 2.5 mm traversing the block horn between its operative and responsive faces. Also included are methods of ultrasonic cutting using such cutting systems.

20 Claims, 2 Drawing Sheets

ULTRASONIC CUTTING SYSTEM

FIELD OF THE INVENTION

The present invention relates to an ultrasonic cutting system for use on foods or other confectionary products. The invention also relates to a method for cutting a material using the ultrasonic cutting system.

BACKGROUND OF THE INVENTION

The conventional method of ultrasonic cutting involves the use of a cutting blade which is mounted on an ultrasonic vibrating device with the blade lying in a plane containing the longitudinal axis of vibrations, and moving the blade through the article to be cut in said plane. However, difficulty is experienced using such conventional methods in that the depth of the cut that can be attainable is limited.

For this reason, ultrasonic cutting has in general been limited to thin articles such as paper, cloth, and thin plastic sheets. Significant problems exist in cutting blocks of substantial depth, and in providing a number of parallel cuts simultaneously. In the edible confectionery field, the current market trend is towards lighter, softer, and stickier products. Not only are such products difficult to cut ultrasonically, but a lot of waste may result using current cutting techniques. Examples include sticky materials, such as caramel, or composite materials which are composed of different materials having different viscosities or hardness. These confectionery products may include a mixture of chocolate, nougat, caramel, and nuts, which tend to drag causing the product to lift before passing through the cutting blade, or they may bend the cutting blade resulting in a product of uneven width and that is often overheated. Difficulty is also experienced in cutting materials that are brittle or friable, such as honeycomb or crystalline materials, which may shatter if dropped. Often, the cutting blades are not sufficiently reliable for long-term use due to such problems.

In our co-pending application, EP-A-0943405, we describe an ultrasonic cutting system that significantly reduces the above problems and difficulties. The ultrasonic cutting system claimed comprises: an ultrasonic vibrating device having an operative face; a block horn having a responsive face connected to the operative face of the ultrasonic vibrating device and an operative face; and a plurality of cutting blades mounted on the operative face of the block horn, so as to be vibrated therewith. The blades are in a plane containing the longitudinal axis of vibrations, such that the block horn is provided with at least one tuning slot traversing the block horn between the operative and responsive faces.

However, we have found that when using the system described in EP-A-0943405, the fatigue life of the blades is not entirely satisfactory. The ultrasonic system is essentially a resonant structure with enough inherent damping to control the vibrational amplitude. The cut material acts as a damping medium and will stabilize the cutting blades. The main problem is that when the system is removed from the product and runs in the air, the transient force applied to the blades can cause the system to "mode hop" , i.e., change from a longitudinal mode of vibration at 36 kHz to a lateral or flexural mode at some lower sub-harmonic. This lateral or flexural mode can be very destructive. The tip amplitude can change from 65 $\mu$m up to 2 mm, which causes extreme acceleration forces that can cause the blade to fracture within seconds.

Thus, it is desired to provide an improved ultrasonic system for cutting thicker- and/or stickier-type products while minimizing the tendency of the cutting blade to fracture.

SUMMARY OF THE INVENTION

The present invention relates to an ultrasonic cutting system including an ultrasonic vibrating device having an operative face; a block horn having a response face connected to the operative face of the ultrasonic vibrating device, and a second operative face, and being provided with at least one normal tuning slot having a first width traversing the block between its operative and responsive faces and at least one thin tuning and damping slot having a second width traversing the block horn between its operative and responsive faces, wherein the second width is smaller than the first width; and a plurality of cutting blades mounted on the second operative face, so as to be vibrated therewith, the blades lying in a plane containing the longitudinal axis of vibrations.

In a preferred embodiment, the width of the normal tuning slots is from about 4 mm to about 6 mm and the width of the thin tuning slots is from about 0.1 mm to about 2.5 mm. In another embodiment, the length of the block horn between the operative and responsive faces is from about 60 mm to about 70 mm, the width of the operative and responsive faces is from about 60 mm to about 70 mm, and the thickness that the tuning slots traverse is from about 15 mm to about 25 mm. In another embodiment, the block horn includes a shoulder on one or more sides of the responsive face. Preferably, the block horn includes aluminum or titanium.

In another embodiment, the number of cutting blades mounted on the operative face of the block horn is from 2 to 6. In a preferred embodiment, an odd number of cutting blades is used.

In yet another embodiment, the cutting blade is detuned to a value from about 80 Hz to about 200 Hz different from that of the operative face of the block horn, the cutting blade frequency is from about 10 kHz to about 60 kHz, and its amplitude is from about 20 $\mu$m to about 250 $\mu$m. In another embodiment, the cutting blade is detuned to a value sufficiently different from that of the operative face of the block horn so as to stabilize the system, reduce the gain, and slightly widen the frequency of the operation. The blade is then machined to set its orientation.

In a further embodiment, the blades have a length of about 50 mm to about 100 mm, a thickness of about 1.4 mm to about 3.4 mm, and the distance between them is from about 15 mm to about 35 mm. In another embodiment, the cutting blades are independently offset relative to the vertical axis. In an additional embodiment, the number of normal tuning slots in the blades is one less than the number of cutting blades.

In another embodiment, the thin tuning and damping slots have a width of about 0.15 mm to about 1.0 mm. In another embodiment, a plurality of ultrasonic cutting systems are connected in series to increase the total number of cutting blades. A preferred embodiment has 5 to 10 systems connected in series to provide a total of about 20 to 40 blades.

The invention also relates to an apparatus for cutting a material including: an ultrasonic vibrating device having an operative face; a block horn having a responsive face connected to the operative face of the ultrasonic device and a second operative face, and being provided with at least one normal tuning slot traversing the block horn between its operative and responsive faces having a width of about 4 mm to about 6 mm; a plurality of cutting blades mounted on the operative face of the block horn so as to be vibrated therewith, the blades lying in a plane containing the longitudinal axis of vibrations; means for conveying the material to be cut; and means for causing the cutting blades to ultrasonically vibrate while moving the cutting blades in the plane through the material such that the block horn is also provided with at least one tuning and damping slot having a width of about 0.1 mm to about 2.5 mm traversing the block horn between its operative and responsive faces.

In one embodiment, the material to be cut is conveyed by a conveyor belt which supports the material. Preferably, the material to be cut is conveyed by an upper and lower conveyor belt that reduce lifting of the material as it is conveyed.

The invention further relates to a method for cutting a material, which includes: conveying the material past the ultrasonic system described above; and passing the blades through the material at ultrasonic frequencies so as to cut the material.

In one embodiment, the material is conveyed from beneath the ultrasonic cutting system on a conveyor belt at a speed of up to about 10 meters per minute. In another embodiment, the material to be cut is transported beneath the ultrasonic cutting system between upper and lower conveyor belts to inhibit lifting of the material as it is conveyed. In a further embodiment, the material to be cut is a mixture of two or more of: chocolate, nougat, caramel, nuts, bakery products, snack products, meals, filled dough products, or ice cream. In yet another embodiment, the blades pass through the material at a frequency of about 10 kHz to about 60 kHz.

BRIEF DESCRIPTION OF THE DRAWINGS

The present invention will now be further illustrated with reference to the accompanying drawings.

DETAILED DESCRIPTION OF THE INVENTION

Figure 1:
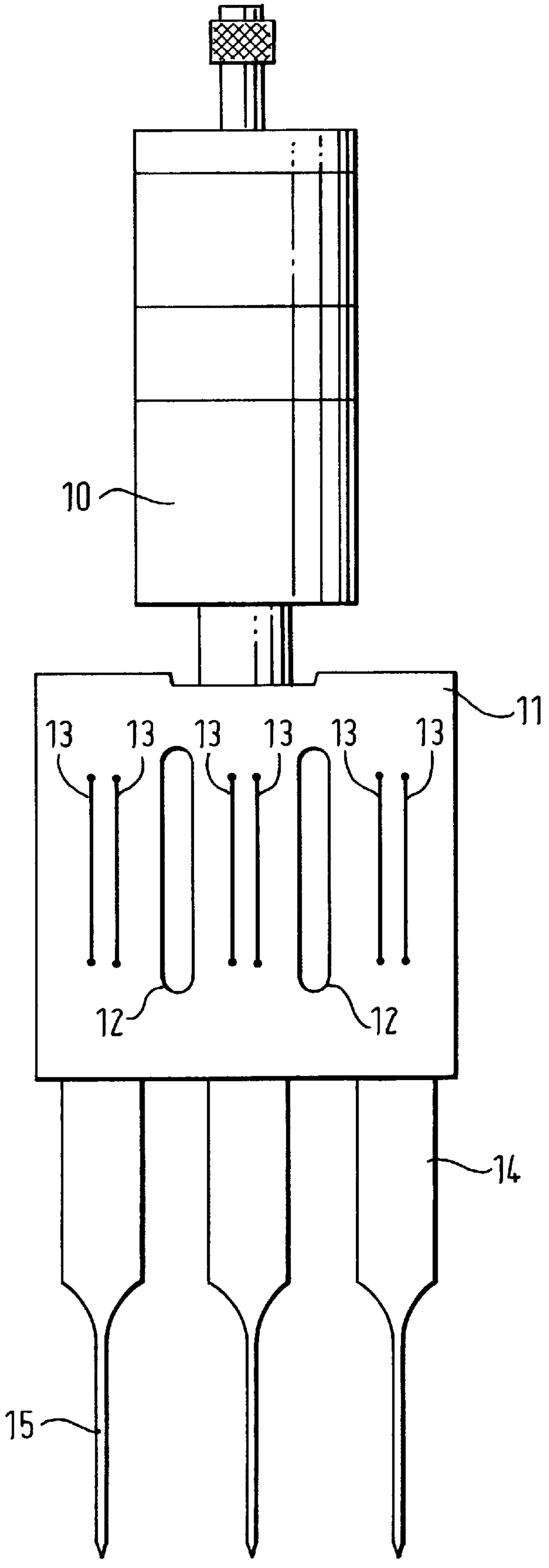
FIG. 1 represents a plan view of an ultrasonic cutting system of the invention.

It has now been surprisingly found that when at least one thin tuning and damping slot having a width of about 0.1 mm to about 2.5 mm is included in at least one blade, in addition to the wider tuning slots described in our co-pending patent application (hereinafter referred to as the "normal tuning slots"), the fatigue life of the blades is significantly increased, e.g., the blades can run for at least about 4 months or more in continuous operation.

Accordingly, the present invention provides an ultrasonic cutting system including: an ultrasonic vibrating device having an operative face; a block horn having a responsive face connected to the operative face of the ultrasonic vibrating device and an operative face and being provided with at least one normal tuning slot traversing the block horn between its operative and responsive faces; a plurality of cutting blades mounted on the operative face of the block horn so as to be vibrated therewith; the blades lying in a plane containing the longitudinal axis of vibrations such that the block horn is also provided with at least one tuning and damping slot traversing the block horn between its operative and responsive faces; the thin tuning slots having a smaller width than that of the normal tuning slots. In a preferred embodiment, the width of the normal tuning slots is typically from about 4 mm to about 6 mm and the width of the thin tuning slots is typically from about 0.1 mm to about 2.5 mm.

The invention relates to such an ultrasonic cutting system capable of cutting through thicker and stickier types of food or confectionary products. The ultrasonic vibrating device may be, for instance, a piezo-electric sandwich-type transducer producing sinusoidal motion secured to the responsive face of a block horn, either directly or indirectly through a booster device.

The block horn may be made to include any sufficiently rigid metal, but can preferably be made to include aluminum or titanium. The length of the block horn between the operative and responsive faces is typically about 30 mm to about 150 mm, preferably about 40 mm to about 100 mm, and more preferably about 60 mm to about 70 mm. The width of the operative and responsive faces is typically from about 30 mm to about 150 mm, preferably about 40 mm to about 100 mm, and more preferably about 60 mm to about 70 mm, and the thickness that the tuning slots traverse is typically about 10 mm to 30 mm, preferably about 15 mm to about 25 mm, and more preferably about 18 mm to about 22 mm.

One of the problems that may occur is the destabilization of the cutting system due to distortion of the block horn during use. The distortion can occur when the outer edge of the operative face has at least about 20% more amplitude than the center of this face. In order to reduce distortion, the block horn may advantageously be provided with a shoulder on its responsive face. The shoulder is preferably a square section added to the outer edges of the block horn. This will keep the amplitude of the outer edge from being greater than the amplitude of the center of the face. The shoulder may be on each side of the block horn and may be stepped. The distortion can thus be reduced to about 5% or less using at least one shoulder in order to stabilize the cutting system.

There may be from 2 to 6 cutting blades mounted on the operative face of the block horn, and preferably from 3 to 5. An odd number of cutting blades provides an advantage over a system with an even number of blades. Also, a system composed of an odd number of elements, i.e., transducer, block horn and blade, provides an advantage over a system with an even number of elements. The use of an odd number of blades and/or elements helps inhibit or avoid undesired distortion or mode hopping. The system tends to be more unstable if an even number of blades is used by amplifying any vibrations that may occur within the system. The cutting blades can be made of any suitable metal that is fracture-resistant, but are preferably made of steel.

The cutting blade frequency is typically from about 10 kHz to about 60 kHz, preferably from about 15 kHz to about 55 kHz, more preferably from about 20 kHz to about 50 kHz, and the amplitude of the cutting blade is typically from about 20 $\mu$m to about 250 $\mu$m, preferably from about 40 $\mu$m to about 200 $\mu$m, and more preferably from about 75 $\mu$m to about 175 $\mu$m. The cutting blade is preferably detuned to a value sufficiently different to that of the operative face of the block horn to stabilize the system and reduce the gain and slightly widen the frequency of operation of the system, e.g., by from about 80 Hz to about 200 Hz, and preferably from about 100 Hz to about 190 Hz on either side of the frequency of operation. In one embodiment, the cutting blade is detuned to a value of about 130 Hz to about 170 Hz. The blade is then machined to set the orientation of the individual blade so that the blades are parallel with each other and correctly aligned with the operative face of the block horn.

The blades are run at a slightly higher or lower frequency than the rest of the system. This has the effect of stabilizing the blade vibrational behavior. In particular, without being bound by theory, it is believed that the flexural modes tend to be low frequency and high amplitude, which tends to lead to blade fracture. Any resonant system that has high gain is believed to be inherently unstable. The intention of the invention is to reduce the gain, making the system more stable. The alternative is to apply damping to the system, but this may absorb the vibrational energy such that internal heating occurs. Detuning the system has a similar effect without the internal heating. Thus, although either method of stabilizing the system is suitable, the detuning method of stabilization is preferred.

The length of the blades are about 50 mm to about 100 mm, preferably from about 70 mm to 80 mm. The width of the blades is from about 5 mm to about 20 mm, preferably from 10 mm to 15 mm. The thickness of the blades is from about 1.4 mm to about 3.5 mm, preferably from about 1.5 mm to about 3.0 mm and more preferably from about 1.6 mm to about 2.4 mm. The distance between the blades is from about 15 mm to about 35 mm, preferably from about 20 mm to about 26 mm. The cutting blade may have a shoulder which is preferably clamped against the operating face of the block horn. The length of the shoulder is from about 25 mm to about 45 mm, preferably from about 30 mm to about 35 mm. The width of the shoulder is typically about 10 mm to about 15 mm. The shoulder of the cutting blade can be provided with spanner slots in its front and rear faces, which provide a suitable means for tightening the blade to the operative face of the block horn.

The blades may be positioned vertically, but are preferably positioned offset relative to the vertical axis, for instance, at an angle of from about 5° to about 20°, preferably from about 10° to about 15°. The blades can also be positioned independently of each other if desired.

The number of normal tuning slots is preferably one less than the number of cutting blades. The normal tuning slots are preferably offset relative to a pair of blades in a longitudinal plane. The size of the normal tuning slots may be chosen to reduce or eliminate transverse vibrations and reduce distortion of the block. For instance, the normal tuning slots may have a length of from about 20 mm to about 60 mm, preferably from about 30 to about 50 mm and more preferably from about 35 mm to about 45 mm. The width of the normal tuning slots is preferably from about 4.5 mm to about 5.5 mm.

The thin tuning and damping slots have a width of from about 0.15 mm to 1.0 mm, preferably from about 0.2 mm to 0.75 mm, and more preferably from about 0.25 mm to about 0.6 mm. The length of the tuning and damping slots is less than the length of the normal tuning slots and may be, for instance, from about 10 mm to about 50 mm, preferably from about 20 mm to about 40 mm and more preferably from about 25 mm to about 35 mm.

From one to four thin tuning slots are positioned between each pair of normal tuning slots, and preferably two or three thin tuning slots are positioned between each pair of normal tuning slots, i.e., in the same longitudinal plane as the blades. When two or more thin tuning slots are positioned between a pair of normal tuning slots, the space between the slots is from about 0.1 mm to about 10 mm, preferably from about 1 mm to about 8 mm, more preferably from about 2 mm to about 6 mm.

It should be understood in this invention that the dimensions of the blades, normal tuning slots, and the thin tuning and damping slots, are normally correspondingly larger for lower frequencies and smaller for higher frequencies. These dimensions may be readily adjusted by one of ordinary skill in the art.

Each part of the block horn carrying a blade is referred to as a "limb" herein, and it has been discovered that making the two outer limbs of the block horn wider than the central portion aids the stability of the structure. It has been discovered, however, that three identical limbs in a block horn can sometimes act as resonant structures and effectively work as a tuning fork, causing unacceptably high vibrational amplitudes within the block horn. For example, a block horn with three limbs, the two outer limbs may each be 19 mm wide, the central limb 16 mm wide, and two slots each 5 mm wide has an overall width of 64 mm. Since the outer limbs are larger than the central limb, the system is stable and not resonant to vibrations.

A plurality of ultrasonic cutting systems according to this invention may be connected in series to increase the number of cutting blades, e.g., from 5 to 10 cutting systems in series to provide a total number of blades of from 20 to 40.

The present invention also provides an apparatus for cutting a material including: an ultrasonic vibrating device having an operative face; a block horn having a responsive face connected to the operative face of the ultrasonic vibrating device and an operative face and being provided with at least one normal tuning slot having a width of from about 4 to about 6 mm traversing the block horn between its operative and responsive faces; a plurality of cutting blades mounted on the operative face of the block horn so as to be vibrated therewith, the blades lying in a plane containing the longitudinal axis of vibrations, means for conveying the material to be cut; and means for causing the cutting blades to be ultrasonically vibrated while moving said cutting blades in said plane through said material, such that the block horn is has at least one thin tuning and damping slot having a width of from about 0.1 mm to about 2.5 mm traversing the block horn between its operative and responsive faces.

The means for providing support for the material to be cut as it passes through the cutting head may be, for example, a conveyor belt which supports the material, e.g., an upper guide belt and a lower conveyor belt or individual "V" belts which effectively sandwich the material as it is conveyed.

The present invention further provides a method of cutting a material which includes conveying the material beneath the ultrasonic cutting system described herein. The material is conveniently transported beneath the ultrasonic cutting system on a conveyor belt. The speed of the material may be up to about 10 meters per minute, preferably from about 1 meter to about 8 meters per minute, and more preferably from about 2 meters to about 6 meters per minute.

The material to be cut can be transported beneath the ultrasonic cutting system 20 between an upper guide belt and a lower conveyor belt, which effectively sandwich the material as it is conveyed. The use of such upper and lower conveyor belts, substantially prevents the tendency of the material to lift up as it passes through the cutting blades due to the drag of the blades. This tendency is more pronounced when more cutting blades are used in the system.

The material being cut may include a sticky material, a brittle or friable material, or a composite material composed of different materials having different viscosities or hardnesses. These materials present some difficulty for conventional ultrasonic cutting systems. Suitable materials which may be cut by the ultrasonic cutting system of this invention, however, are confectionery products including a mixture or combination of chocolate, nougat, caramel, nuts, bakery products, snack products, meals, filled dough products, ice cream, or combinations thereof.

The drawings show one embodiment of the present invention. Referring FIG. 1, a transducer/booster assembly 10 is shown to which is attached a block horn 11 provided with two normal tuning slots 12 each having a length of 40 mm and a width of 4 mm, and thin tuning and damping slots 13 each having a length of 31.5 mm and a width of 0.5 mm, each member of a pair being spaced 4 mm apart. Attached to the block horn are cutting blades 14 each provided with a cutting edge 15.

Figure 2:
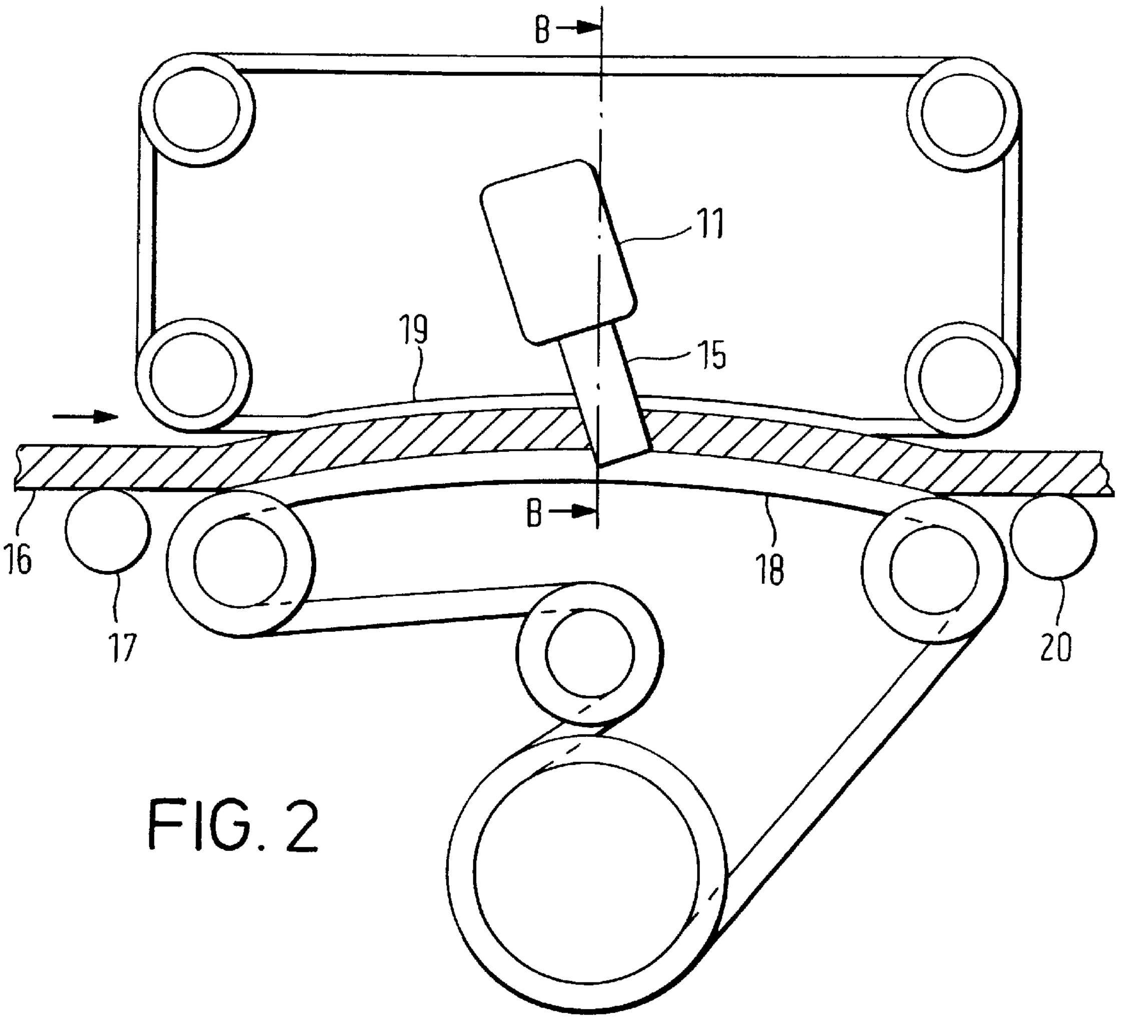
FIG. 2 represents a diagrammatic side view of the ultrasonic cutting system of the invention cutting a nougat material.
Figure 3:
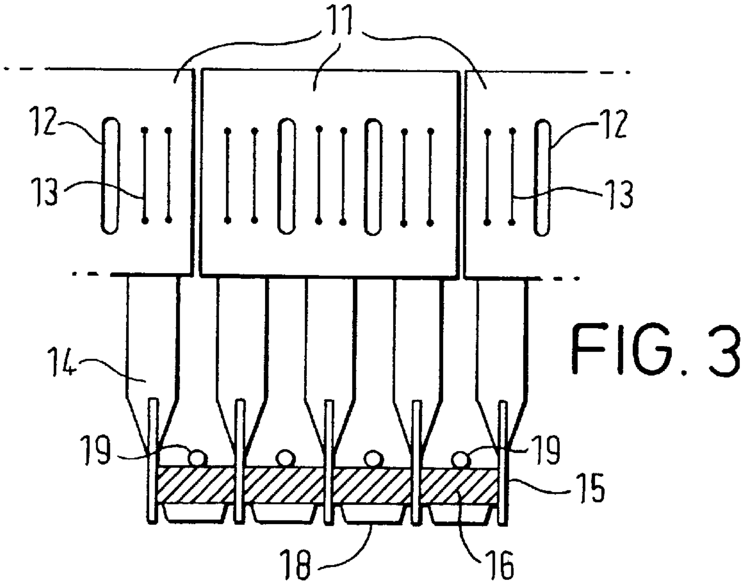
FIG. 3 represents a section through the line B—B of FIG. 2.

FIGS. 2 and 3 show the nougat material 16 being transported on a conveyor belt 17 in the direction of the arrow and then sandwiched between a lower drive belt 18 and an upper guide belt 19 where it passes beneath the ultrasonic cutting system, i.e., the block horn 11 and cutting blades 15. The cutting blades are ultrasonically vibrated while passing vertically downward through the nougat material to cut it, the cut nougat material being finally transported away on conveyor belt 20.

The fatigue life of blades using the tuning and damping slots according to the invention having a width of 0.5 mm was found to be at least 4 months during continuous operation.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention. It will also be understood that the mechanical details of every design may be slightly different or modified by one of ordinary skill in the art without departing from the method and apparatus of the present invention.

What is claimed is:

1. An ultrasonic cutting system comprising:

an ultrasonic vibrating device having an operative face;

a block horn, having a responsive face connected to the operative face of the ultrasonic vibrating device, and a second operative face, and being provided with at least one normal tuning slot having a first width traversing the block between its operative and responsive faces, at least one thin tuning and damping slot having a second width traversing the block horn between its operative and responsive faces, wherein the second width is smaller than the first width; and a plurality of cutting blades mounted on the second operative face, so as to be vibrated therewith, the blades lying in a plane containing the longitudinal axis of vibrations.

2. The ultrasonic cutting system of claim 1, wherein the first width of the at least one normal tuning slot is about 4 mm to about 6 mm and the second width of the at least one thin tuning and damping slot is about 0.1 mm to about 2.5 mm.

3. The ultrasonic cutting system of claim 1, wherein the length of the block horn between the operative and responsive faces is from about 30 mm to about 150 mm, the width of the operative and responsive faces is from about 30 mm to about 150 mm, and the thickness that the tuning slots traverse is from about 10 mm to about 30 mm.

4. The ultrasonic cutting system of claim 1, wherein the block horn comprises a shoulder on one or more sides of the responsive face.

5. The ultrasonic cutting system of claim 1, wherein the block horn comprises aluminum or titanium.

6. The ultrasonic cutting system of claim 1, wherein the number of cutting blades mounted on the operative face of the block horn is from 2 to 6.

7. The ultrasonic cutting system of claim 1, wherein an odd number of cutting blades is used.

8. The ultrasonic cutting system of claim 1, wherein the cutting blade is detuned to a value from about 80 Hz to about 200 Hz different from that of the operative face of the block horn.

9. The ultrasonic cutting system of claim 1, wherein the cutting blade frequency is from about 10 kHz to about 60 kHz and the amplitude of the cutting blade is from about 20 $\mu$m to about 250 $\mu$m.

10. The ultrasonic cutting system of claim 1, wherein the cutting blade is detuned to a value sufficiently different from that of the operative face of the block horn so as to stabilize the system, reduce the gain, and slightly widen the frequency of the operation, and then machined to set the orientation of the individual blade.

11. The ultrasonic cutting system of claim 1, wherein the length of the blades is from about 50 mm to about 100 mm, the thickness of the blades is from about 1.4 mm to about 3.5 mm, and the distance between the blades is from about 15 mm to about 35 mm.

12. The ultrasonic cutting system of claim 1, wherein the cutting blades are each independently offset relative to the vertical axis.

13. The ultrasonic cutting system of claim 1, wherein the number of normal tuning slots is one less than the number of cutting blades.

14. The ultrasonic cutting system of claim 1, wherein the normal tuning slots are offset relative to a pair of blades in the longitudinal plane.

15. The ultrasonic cutting system of claim 1, wherein the thin tuning and damping slots each have a width of from about 0.15 mm to about 1.0 mm.

16. The ultrasonic cutting system of claim 1, wherein a plurality of the ultrasonic cutting systems are connected in series to increase the number of cutting blades.

17. The ultrasonic cutting system of claim 16, wherein 5 to 10 ultrasonic cutting systems are connected in series, so as to provide a total of 20 to 40 blades.

18. An apparatus for cutting a material comprising:

an ultrasonic vibrating device having an operative face;

a block horn having a responsive face connected to the operative face of the ultrasonic vibrating device and a second operative face, and being provided with at least one normal tuning slot traversing the block horn between its operative and responsive faces having a width of from about 4 mm to about 6 mm;

a plurality of cutting blades mounted on the operative face of the block horn so as to be vibrated therewith, the blades lying in a plane containing the longitudinal axis of vibrations;

means for conveying the material to be cut; and means for causing the cutting blades to ultrasonically vibrate while moving said cutting blades in said plane through said material such that the block horn is also provided with at least one thin tuning and damping slot having a width of from about 0.1 mm to about 2.5 mm traversing the block horn between its operative and responsive faces.

19. The apparatus of claim 18, wherein the means for conveying the material to be cut comprises a conveyor belt which supports the material.

20. The apparatus of claim 18, wherein the means for conveying the material to be cut comprises an upper and a lower conveyor belt that reduce lifting of the material as it is conveyed.

* * * * *